US008561060B2

(12) United States Patent
Serebrin et al.

(10) Patent No.: US 8,561,060 B2
(45) Date of Patent: Oct. 15, 2013

(54) PROCESSOR AND METHOD CONFIGURED TO DETERMINE AN EXIT MECHANISM USING AN INTERCEPT CONFIGURATION FOR A VIRTUAL MACHINE

(75) Inventors: Benjamin C. Serebrin, Mountain View, CA (US); Michael J. Haertel, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1678 days.

(21) Appl. No.: 11/740,463

(22) Filed: Apr. 26, 2007

(65) Prior Publication Data

US 2008/0271014 A1  Oct. 30, 2008

(51) Int. Cl.
*G06F 9/455*  (2006.01)
(52) U.S. Cl.
USPC .............................................................. 718/1
(58) Field of Classification Search
None
See application file for complete search history.

(56) References Cited

U.S. PATENT DOCUMENTS

| | | | |
|---|---|---|---|
| 5,522,075 A | 5/1996 | Robinson et al. | |
| 5,822,778 A | 10/1998 | Dutton et al. | |
| 5,826,084 A | 10/1998 | Brooks et al. | |
| 6,061,711 A * | 5/2000 | Song et al. | 718/108 |
| 6,785,886 B1 | 8/2004 | Lim et al. | |
| 7,418,584 B1 | 8/2008 | Klaiber et al. | |
| 8,078,792 B2 | 12/2011 | Serebrin et al. | |
| 8,099,541 B2 | 1/2012 | Serebrin | |
| 2003/0217250 A1 | 11/2003 | Bennett | |
| 2004/0064813 A1* | 4/2004 | Neiger et al. | 718/1 |
| 2004/0117532 A1 | 6/2004 | Bennett | |
| 2005/0081199 A1 | 4/2005 | Traut | |
| 2005/0091652 A1 | 4/2005 | Ross et al. | |
| 2006/0206892 A1* | 9/2006 | Vega et al. | 718/1 |
| 2007/0106986 A1 | 5/2007 | Worley, Jr. | |
| 2009/0113111 A1 | 4/2009 | Chen et al. | |

OTHER PUBLICATIONS

Keith Adams, et al., "A Comparison of Software and Hardware Techniques for x86 Virtualization," ASPLOS'06, Oct. 21-25, 2006, ACM, 12 pages.
AMD, "AMD64 Technology; AMD64 Architecture Programmer's Manual vol. 2: System Programming," Publication 24593, Revision 3.12, Sep. 2006, pp. 355-411.
P.H. Gum, "System/370 Extended Architecture: Facilities for Virtual Machines," IBM J. Res Develop., vol. 27, No. 6, Nov. 1983, pp. 530-544.
James L. Turley, "Advanced 80386 Programming Techniques," ISBN 0-07-881342-5, 35 pages.
U.S. Appl. No. 12/272,946, filed Nov. 18, 2008.
U.S. Appl. No. 12/272,955, filed Nov. 18, 2008.

(Continued)

*Primary Examiner* — Meng An
*Assistant Examiner* — Eric C Wai
(74) *Attorney, Agent, or Firm* — Lawrence J. Merkel; Meyertons, Hood, Kivlin, Kowert & Goetzel, P.C.

(57) ABSTRACT

In one embodiment, a processor comprises one or more registers coupled to an execution core. The registers are configured to store an intercept configuration that identifies which of a plurality of intercept events are enabled for intercept during guest execution. Additionally, the intercept configuration identifies, for each enabled intercept event, which of at least two exit mechanisms are to be used in response to detection of the enabled intercept event. The execution core is configured to detect one of the enabled intercept events during execution of a guest and to exit the guest using the exit mechanism identified in the intercept configuration for that detected, enabled intercept event.

19 Claims, 9 Drawing Sheets

(56) References Cited

OTHER PUBLICATIONS

U.S. Appl. No. 12/272,956, filed Nov. 18, 2008.
Office Action from U.S. Appl. No. 12/272,955, mailed Mar. 18, 2011, Benjamin C. Serebrin, 9 pages.
Office Action from U.S. Appl. No. 12/272,956, mailed Mar. 18, 2011, Benjamin C. Serebrin, 6 pages.
Office Action from U.S. Appl. No. 12/272,946, mailed Sep. 15, 2011, Global Foundries, all pages.

* cited by examiner

Partial Host State Saved by VMRUN Instruction/Loaded at Guest Exit

CS.Selector
    next_RIP
    RFLAGS
    RAX
    SS.Selector
    RSP
    CR0
    CR3
    CR4
    EFER
    IDTR
    GDTR
    DS.Selector
    ES.Selector

102 — 100

Partial Guest State Loaded by VMRUN Instruction/Saved at Guest Exit

CS.Selector and CS.Hidden
    RIP
    RFLAGS
    RAX
    SS.Selector and SS.Hidden
    RSP
    CR0
    CR2
    CR3
    CR4
    EFER
    IDTR
    GDTR
    DS.Selector and DS.Hidden
    ES.Selector and ES.Hidden
    DR6 and DR7
    VM Regs

Fig. 7

PROCESSOR AND METHOD CONFIGURED TO DETERMINE AN EXIT MECHANISM USING AN INTERCEPT CONFIGURATION FOR A VIRTUAL MACHINE

BACKGROUND

1. Field of the Invention

This invention relates to virtual machines in computer systems and, more particularly, to switching between virtual machines and the host.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Both the VMM and the guests are executed by the processor(s) included in the physical machine. Accordingly, switching between execution of the VMM and the execution of guests occurs in the processor(s) over time. Particularly, the VMM schedules a guest for execution, and a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Generally, the world switch involves saving all of the processor's state for the guest/VMM being switched away from, and restoring all of the processor's state for the guest/VMM being switched to. In some cases, saving/restoring all of the state is necessary. For example, when a guest is being started for the first time, none of the corresponding processor state has been loaded and thus all of the processor state may be saved/loaded. However, in other cases, some of the processor state may not change from guest context to VMM context and vice-versa. In still other cases, a world switch may be brief (e.g. the VMM may execute briefly to service a simple guest exit for an intercepted event), and only a small amount of processor state for the VMM may be needed.

SUMMARY

In one embodiment, a processor comprises one or more registers coupled to an execution core. The registers are configured to store an intercept configuration that identifies which of a plurality of intercept events are enabled for intercept during guest execution. Additionally, the intercept configuration identifies, for each enabled intercept event, which of at least two exit mechanisms are to be used in response to detection of the enabled intercept event. The execution core is configured to detect one of the enabled intercept events during execution of a guest and to exit the guest using the exit mechanism identified in the intercept configuration for that detected, enabled intercept event.

In another embodiment, a computer accessible storage medium stores a data structure that corresponds to a guest executable on a computer. The data structure comprises an intercept configuration that identifies which of a plurality of intercept events are enabled for intercept during execution of the guest to cause an exit from the guest. Additionally, the intercept configuration further identifies, for each enabled intercept event, which of at least two exit mechanisms is to be used for the exit in response to detecting the enabled intercept event.

In an embodiment, a computer accessible storage medium stores a plurality of instructions executed by a computer in response to selecting a first exit mechanism of at least two exit mechanisms to exit a guest, wherein the exit is in response to detection of an intercept event during execution of the guest. When executed, the plurality of instructions: process the detected intercept event; return to the guest, if the intercept event is successfully processed; and cause an exit via a second exit mechanism of the at least two exit mechanisms if the intercept event is not successfully processed.

In another embodiment, a method comprises detecting a enabled intercept event during execution of a guest. The intercept configuration identifies which of a plurality of intercept events are enabled for intercept and, for each enabled intercept event, the intercept configuration identifies which of at least two exit mechanisms are to be used in response to detection of the enabled intercept event. The method further comprises exiting the guest using the exit mechanism identified in the intercept configuration for the detected, enabled intercept event.

BRIEF DESCRIPTION OF THE DRAWINGS

The following detailed description makes reference to the accompanying drawings, which are now briefly described.

FIG. 7 is a pair of tables illustrating one embodiment of processor state saved and loaded during switches between host and guest execution.

Figure 1:
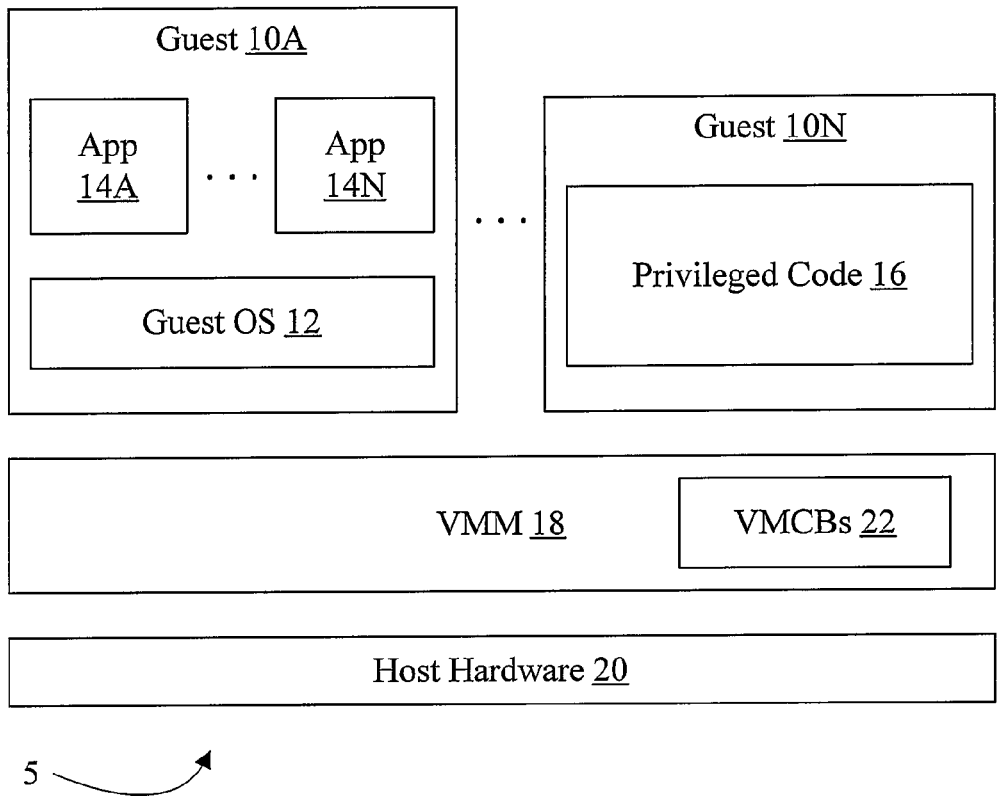
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the operations performed by the processor to exit guest execution (generally in a restartable fashion) and to begin executing other code. In one embodiment, one exit mechanism may include saving a small amount of processor state and loading state for a Minivisor. The Minivisor may execute in the guest physical address space, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

World Switch

The processor(s) in the host hardware 20 may support a world switch using at least two exit mechanisms from the guest, as mentioned above. Specifically, in one embodiment, each exit mechanism may include storing only a certain amount of the guest's processor state (and loading at least some corresponding state for the code to be executed after exit and/or setting state to predetermined values). That is, the amount saved/loaded by the processor may exclude at least some of the processor state. The amount stored in each mechanism may differ, and the amount stored in one mechanism may be greater than the amount stored in another mechanism. The amount of state stored and loaded automatically is generally correlated to the amount of time needed to perform the world switch, and thus is correlated to the performance of the computer system when executing virtual machines. The exit mechanism that stores a lesser amount of state may also be more limited in the processing that it can accomplish (at least without storing additional state) but may be used to perform certain processing that does not require as much state save.

Figure 2:
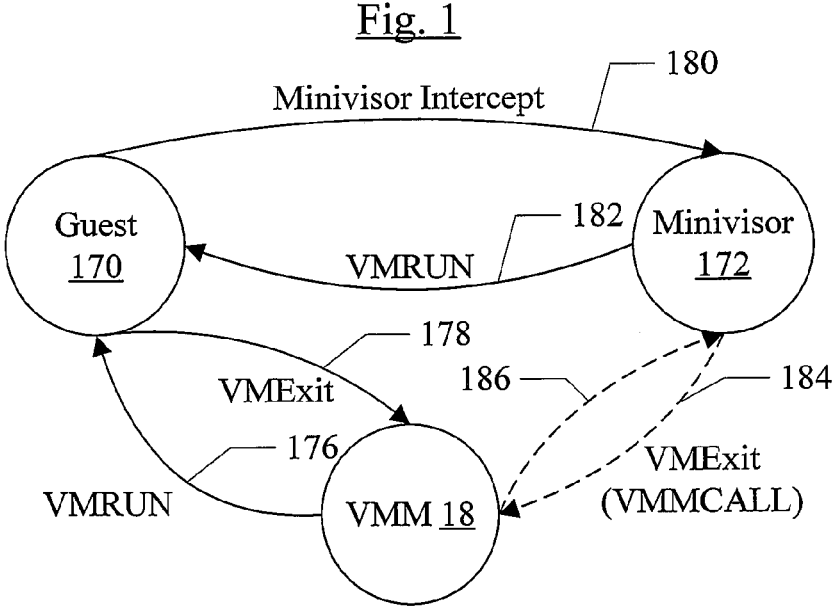
FIG. 2 is a block diagram of one embodiment of various modes that may be supported in the virtualization.

In one embodiment, the exit mechanism that stores less processor state may exit to a "minivisor". The exit mechanism that stores more processor state may be an exit to the VMM 18. FIG. 2 is a block diagram illustrating various transitions, for one embodiment. A guest 170 is shown, along with a minivisor 172 and the VMM 18. The guest 170 may be, e.g., one of the guests 10A-10N. Generally, a guest may be initiated by the VMM 18 using the VMRUN instruction (arrow 176). Execution of the VMRUN instruction may enable various intercept events, and may enable exit for the intercept events to either the minivisor 172 or the VMM 18. An exit to the VMM 18 (VMExit, arrow 178) may involve storing a relatively large amount of state. The VMM 18 may process the intercept and return to the guest 170 using the VMRUN instruction, similar to initiating the guest 170 (arrow 176). A minivisor intercept (arrow 180) may involve storing a relatively small amount of state and may invoke the minivisor 172. The minivisor 172 may process the intercept event and return to the guest 170 (e.g. using the VMRUN instruction, arrow 182). If the VMRUN instruction is used to return from the minivisor 172 to the guest 170, there may be an operand or other encoding that informs the processor that the VMRUN is executed in the minivisor 172, so that the proper processor state may be restored. In other embodiments, a different instruction may be used to return to the guest 170, or the VMRUN instruction may be used and a mode in the processor may indicate that the minivisor 172 is executing the VMRUN instruction.

In some embodiments, the minivisor 172 may detect that it is unable to process the intercept event. For example, the minivisor 172 may generally be capable of processing the event, but certain unlikely or infrequent event scenarios may require processing by the VMM 18. Or, the minivisor 172 may be incapable of processing the event but the intercept configuration may be erroneously programmed to exit to the minivisor 172. In such cases, the minivisor 172 may return to the guest 170, but may signal an intercept event that causes an exit to the VMM 18. Thus, the guest 170 may exit again, this time to the VMM 18. Alternatively, the minivisor 172 may have a mechanism for exiting to the VMM 18 (arrow 184). For example, in one embodiment, a VMMCALL instruction may be supported for guests to signal an exit to the VMM 18 (e.g. for paravirtualization). The minivisor 172 may use such an instruction to exit to the VMM 18. The same VMExit mechanism used to exit from the guest 170 to the VMM 18 may be used to exit from the minivisor 172 to the VMM 18, or a different mechanism may be used.

The VMM 18 may process the intercept event, and may return to the guest 170 using the VMRUN instruction. Alternatively, the VMM 18 may be configured to return to the minivisor 172 (arrow 186), using the VMRUN instruction or a different instruction.

In some embodiments, the amount of state stored on VMExit may be less than the total processor state. Thus, the VMExit amount of state may be an intermediate amount that may be sufficient for some types of processing. In other cases, the VMM 18 may save/load additional processor state as needed. However, since only a portion of the state is automatically saved/loaded, the VMM 18 may have flexibility in how much additional state is saved/loaded and thus how much additional processing time is expended in the additional state save/load.

In some embodiments, the processor(s) may support additional instructions defined to save/load additional state to/from the VMCBs 22. These instructions will be referred to herein as the VMLOAD and VMSAVE instructions. The VMLOAD instruction is defined to load additional state from a VMCB 22 to the processor, and the VMSAVE instruction is defined to save additional state to the VMCB 22. For example, in some embodiments, the processor state may include "hidden state" in some registers. As used herein, hidden state is state saved in a processor register that is not directly readable via instruction execution. For example, in the x86 instruction set architecture, the segment registers have a non-hidden portion into which a segment selector identifying a segment descriptor in a segment descriptor table is loaded. Additionally, information from the segment descriptor (or derived from the segment descriptor) is loaded into a hidden portion of the segment register when a segment selector is loaded. The non-hidden portion may also be read from the register via instruction execution (e.g. to be stored to memory), but the hidden portion storing the segment descriptor information cannot be directly read via instruction execution according to the x86 instruction set architecture. In some embodiments, the VMLOAD/VMSAVE instructions may be defined to load/save the hidden state from/to the VMCB 22.

In other embodiments, the VMLOAD/VMSAVE instructions may be defined to load/save the state of two or more control registers that involve serialization in the processor when changed (e.g. paging control registers, mode control registers, etc.). That is, the processor may permit the pipeline to drain of any other instructions, wait for speculative execution of operations to complete, etc. before changing the control registers. While each control register is typically readable/writable using an individual instruction, repeatedly serializing for such individual read/write operations may be slower than having a single instruction that reads/writes multiple control registers. In other embodiments, the VMLOAD/VMSAVE instructions may load/save hidden state and state corresponding to two or more control registers. In still other embodiments, the VMLOAD/VMSAVE instructions may load/save all processor state not loaded/saved by the processor hardware during the switch, or may load/save any subset of the processor state.

As used herein, saving processor state may refer to transferring the processor state from the processor to a storage location (e.g. in memory). The processor state in the processor may not be changed due to the saving. Additionally, restoring processor state may refer to transferring the state from the storage location to the processor. The processor state in the storage location may not be changed due to the restoring.

For convenience and brevity in the remainder of this description, the portion of the processor state that is saved/loaded during a world switch to/from the VMM 18 may be referred to as the VMExit partial state. The portion of the processor state that is saved/loaded during a world switch from the guest 10A-10N to the minivisor 172 may be referred to as the minivisor partial state.

Processor Support

Figure 3:
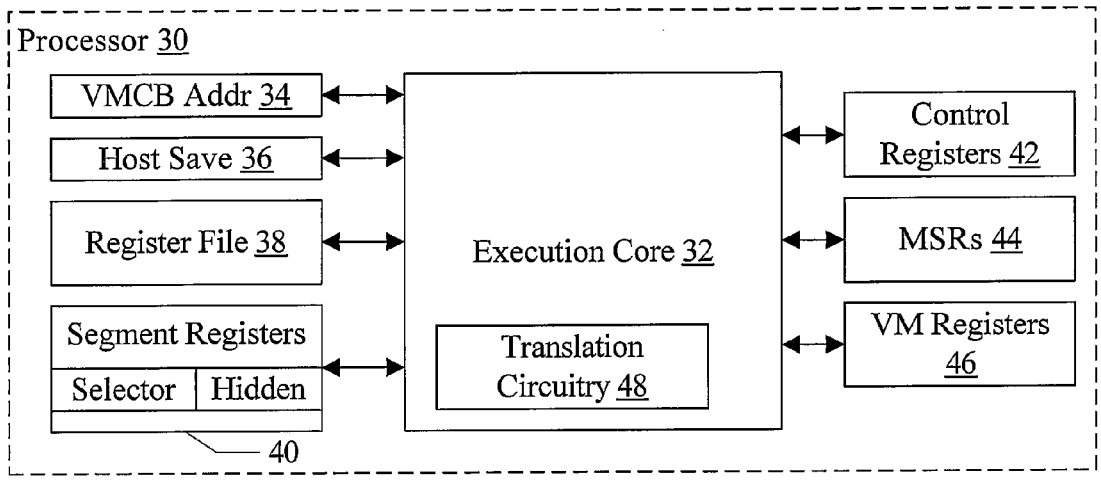
FIG. 3 is a block diagram of a portion of one embodiment of a processor.

FIG. 3 is a block diagram illustrating one embodiment of a processor 30 that may be included in the host hardware 20 and may provide support for world switch using multiple exit mechanisms as mentioned above. In the illustrated embodiment, the processor 30 includes an execution core 32, a VMCB address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a superpipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions. The execution core 32 may also include translation circuitry 48 that performs address translation according to an address translation mechanism defined for the processor 30. In one embodiment, the address translation mechanism may include nested paging to support guests. In nested paging, the processor may support a set of page tables for each guest (translating from guest virtual to guest physical addresses) and another set of page tables (translating from guest physical to host physical addresses). Thus, a tablewalk initiated during guest execution may walk two sets of page tables when nested paging is used.

In one embodiment, the translation circuitry 48 may include a translation lookaside buffer (TLB) configured to cache the results of translations. The TLB may store the portion of the input address that gets translated (guest virtual or guest physical) and the corresponding portion of the resulting translated address (host physical). The portion may be the input/output address with the exception of the least significant bits that form an offset within the page. The page is the unit of translation, and may vary in size.

When executing a VMRUN instruction (described above and in more detail below), the execution core 32 may save the address of the VMCB identified by the VMRUN instruction in the VMCB address register 34. Subsequently, during a guest exit, the execution core 32 may save the partial processor state to the VMCB indicated by the VMCB address register 34. The amount of processor state saved depends on the exit mechanism being used for the detected intercept event. The host save register 36 may store an address of a host save area in which host processor state (e.g. corresponding to the VMM 18) may be saved. The execution core 32 may save VMExit partial processor state in the host save area during execution of the VMRUN instruction, and may load VMExit partial processor state from the host save area during a guest exit to the VMM 18.

In one embodiment, the minivisor partial processor state may be stored in the VMCB 22 of a given guest, in addition to the partial processor state corresponding to the guest itself. Accordingly, guest exit to the minivisor 172 may include storing the minivisor partial processor state to the VMCB 22 and loading the minivisor state from the VMCB 22.

The register file 38 may comprise various registers defined for use with the instructions that the execution core 32 is configured to execute. For example, the register file 38 may comprise integer registers, floating point registers, multimedia registers, etc.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64™ extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), etc.

The MSRs 44 may comprise one or more registers that are implementation dependent. That is, the instruction set architecture may permit a given implementation to define any set of MSRs 44 that may be desirable for that implementation.

The VM registers 46 comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 2 to illustrate the world switch functionality of the processor 30 (in conjunction with the flowchart discussed below). For example, the VM registers 46 may include registers that may be loaded with virtual interrupt state to permit an interrupt to be injected into a guest. The VM registers 46 may also include an intercepts register or registers. The intercept register or registers may store the intercept configuration. The execution core 32 may be configured to monitor for various intercepts indicated in the intercepts register, and to exit using the exit mechanism as indicated in the intercepts register. The intercepts register may be loaded from the VMCB 22 of a guest 10A-10N when execution of that guest 10A-10N is initiated (e.g. using the VMRUN instruction described above). Other VM registers 46 may be included to virtualize various other processor state, system resources, etc. In some embodiments, some or all of the VM registers 46 may be defined as MSRs.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 4:
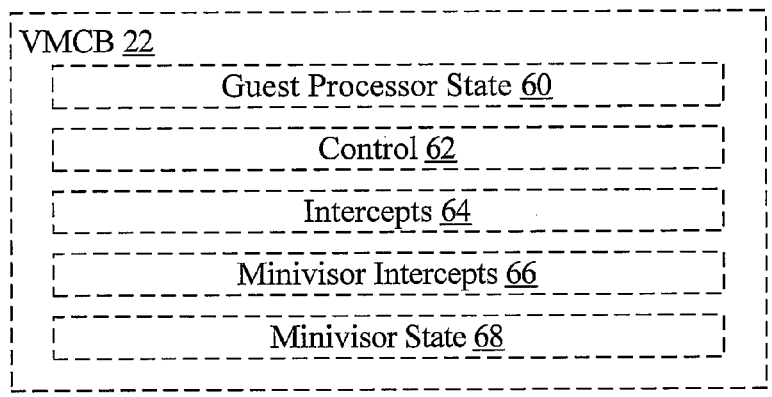
FIG. 4 is a block diagram of one embodiment of a virtual machine control block.

FIG. 4 is a block diagram of one embodiment of a VMCB 22. In the embodiment of FIG. 4, the VMCB 22 may include a guest processor state 60, control data 62, intercepts 64, minivisor intercepts 66, and minivisor state 68. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the VMRUN instruction. The processor 30 may save processor state from the processor 30 to the guest processor state 60 during the guest exit. The guest processor state 60 may be defined to store all the processor state, even though the processor 30 only saves/loads partial state as described above. Other state may be saved/loaded by the VMM 18 and/or the minivisor 172 as needed. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit. The intercepts 64 may specify which events are enabled for intercept (causing an exit from the guest). The intercepts 64 may define exits to the VMM 18, using the VMExit mechanism. Similarly, the minivisor intercepts 66 may specify which events are enabled for intercept, causing a guest exit to the minivisor 172. In other embodiments, the intercepts 64 may specify which intercept events are enabled for intercept, and the intercepts 66 may indicate which exit mechanism to use (VMExit or minivisor exit). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications. There may be one intercept indication in the intercepts 64 and one intercept indication in the intercepts 66 for each intercept event. Thus, the intercepts 64 and 66 may comprise one embodiment of an intercept configuration.

The minivisor state 68 may comprise the processor state corresponding to the minivisor 172. The minivisor state 68 may be smaller than the guest processor state 60, in general. A more specific example of the minivisor state 68 is discussed below. In other embodiments, the minivisor state 68 may be stored in a separate data structure than the VMCB 22.

Figure 5:
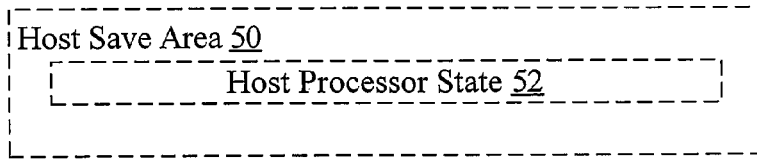
FIG. 5 is a block diagram of one embodiment of a host save area.

FIG. 5 is a block diagram of one embodiment of a host save area 50 that may be used to store host processor state 52. The host processor state 52, similar to the guest processor state 60, may be defined to store all the processor state that is considered part of the context. However, the host processor state 52 may correspond to the VMM 18 (and other host code, such as a host O/S, in some embodiments). In other embodiments, the host processor state 52 may not be defined to store all the processor state. The host processor state 52 may be defined the same as the guest processor state 60 in some embodiments. The processor 30 may save processor state from the processor 30 to the host processor state 52 during execution of the VMRUN instruction, and may load processor state to the processor 30 from the host processor state 52 during a guest exit to the VMM 18. The host save register 36 may store an address that locates the host save area 50.

Figure 6:
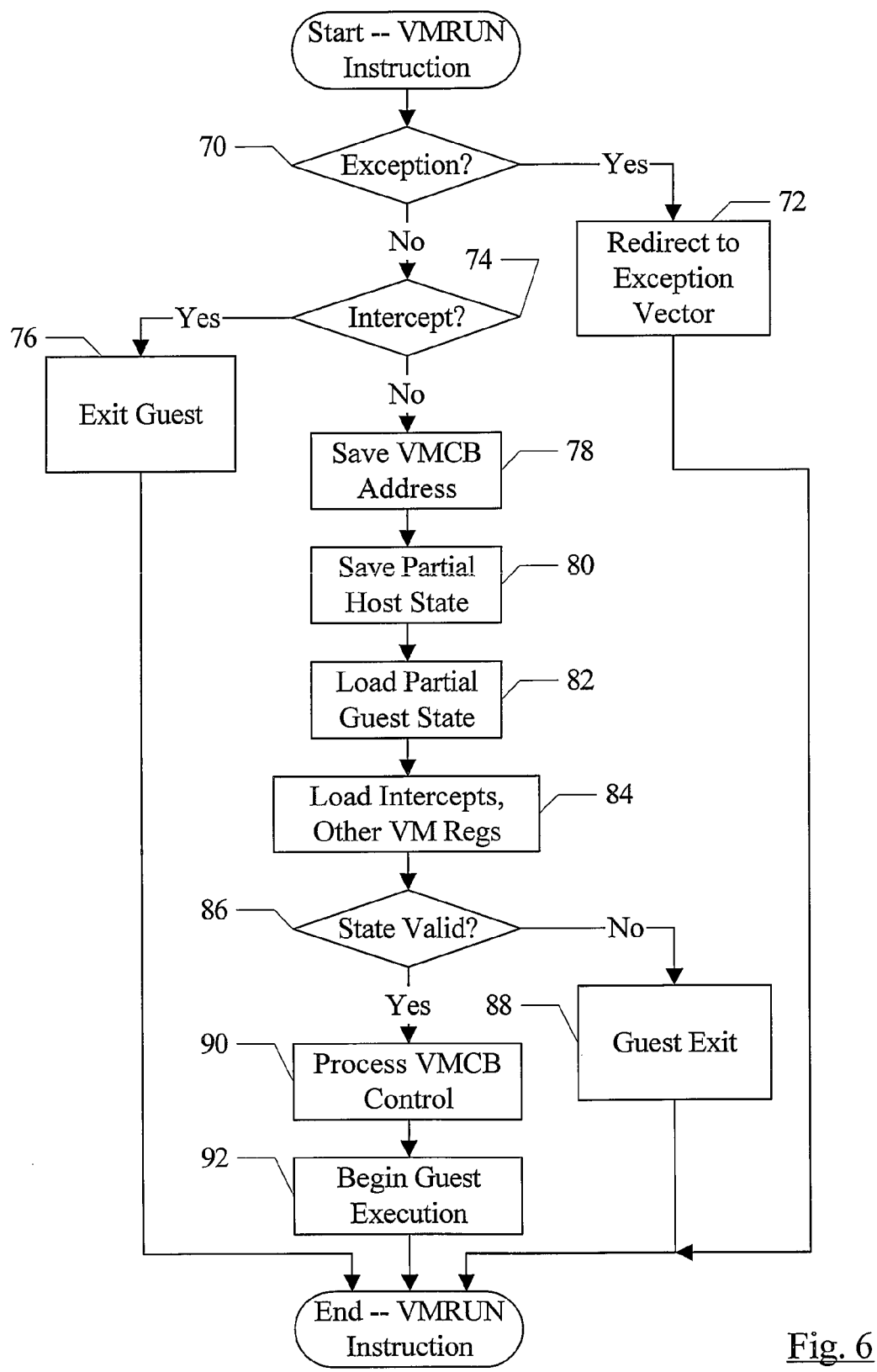
FIG. 6 is a flowchart illustrating operation of one embodiment of a processor in response to a virtual machine run (VMRUN) instruction.

Turning next to FIG. 6, a flowchart is shown illustrating operation of one embodiment of the processor 30 (and more particularly the execution core 32, in the embodiment of FIG. 3) to execute a VMRUN instruction. The processor 30/execution core 32 may comprise circuitry, microcode, or any combination thereof that implements the operation shown in FIG. 6. The execution may be pipelined over multiple clock cycles, if desired.

The execution core 32 may determine if the VMRUN instruction causes an exception (decision block 70). If the VMRUN instruction causes an exception (decision block 70, "yes" leg), the execution core 32 may redirect execution to the exception vector that corresponds to the exception, as defined in the instruction set architecture implemented by the processor 30 (block 72). Various exception conditions occur in various embodiments. For example, in one embodiment, the VMRUN instruction may be enabled via a bit in one of the VM registers 46. If the VMRUN instruction is not enabled, an exception may be signalled. Also, the VMRUN instruction may be a privileged instruction in one embodiment, and thus if the processor 30 is not in a privileged mode (e.g. the privileged mode is a current privilege level of zero in the x86 instruction set architecture), an exception may be signalled. In one embodiment, the VMRUN instruction may only be executed if paging is enabled and in protected mode and thus an exception may be signalled if the proper mode is not set in the control registers 42. In one embodiment, the VMCB 22 may be required to be aligned to a page boundary and the VMRUN instruction may cause an exception if the VMCB 22 is not so aligned. In one embodiment, the VMRUN instruction may not be executed in virtual 8086 mode, and an exception may be signalled if the processor 30 is in virtual 8086 mode.

In one embodiment, execution of the VMRUN instruction is one of the events that may be intercepted. If the execution is intercepted (decision block 74, "yes" leg), the execution core 32 may exit the guest instead of executing the VMRUN instruction (block 76). The exit may be to the minivisor, or to the VMM 18, depending on the corresponding intercept indications.

If there is no exception or intercept (decision block 70, "no" leg and decision block 74, "no" leg), the execution core 32 may save the VMCB address in the VMCB address register 34 (block 78). The VMCB address may be specified by one or more operands of the VMRUN instruction. For example, in one embodiment, the VMCB address may be specified in the RAX register (the 64 bit version of the EAX register defined in the AMD64™ extension to the x86 instruction set architecture). Additionally, execution core 32 may save the VMExit partial host state to the host save area 50 indicated by the host save register 36 (block 80). The execution core 32 may load the VMExit partial guest state from the guest processor state 60 of the VMCB 22 (block 82). Additionally, the execution core 32 may load the intercepts from the intercepts 64 of the VMCB 22 and any other VM registers 46 as specified in the VMCB 22 (block 84).

The execution core 32 may check the processor state as loaded from the VMCB 22 to ensure that a valid state has been loaded (decision block 86). If an invalid state has been loaded (decision block 86, "no" leg), the execution core 32 may exit the guest to the VMM (block 88). In other embodiments, the execution core 32 may cause an exception, if the processor 30 may function in the invalid state, or a processor shutdown (e.g. similar to entering a low power state). In still other embodiments, the execution core 32 may check the state in the VMCB 22 and the processor 30 (for state not loaded during execution of the VMRUN instruction) prior to loading the state to ensure that the state is valid (e.g. as part of determining whether or not to cause an exception, illustrated at decision block 70).

If the processor state is valid (decision block 86, "yes" leg), the execution core 32 may process any operations specified in the VMCB control 62 (block 90). The execution core 32 may then begin guest execution (block 92). It is noted that, if the VMRUN instruction is also used to return from the minivisor 172 to the guest, similar operation may be performed except that the partial state saved/restored may be the minivisor partial state.

FIG. 7 is a pair of tables 100 and 102 illustrating the VMExit partial processor state saved and loaded according to one embodiment of the processor 30 that implements the x86 instruction set architecture (including the AMD64™ extensions). The register names used in the tables 100 and 102 correspond to the names used in the x86 instruction set architecture with AMD64™ extensions. Other embodiments may save/load any partial processor state, including any subset or superset of the state shown.

Table 100 shows the partial host state that is saved during execution of the VMRUN instruction and loaded during guest exit to the VMM 18 for the present embodiment. In the illustrated embodiment, the partial host state includes: the CS segment selector and the instruction pointer of the next instruction in the host after the VMRUN instruction (next_RIP); the flags (RFLAGS); the RAX register; the SS segment selector; the current stack pointer (RSP); the control registers CR0, CR3, CR4, and EFER; the interrupt descriptor table register (IDTR); the global descriptor table register (GDTR); the ES segment selector; and the DS segment selector.

Table 102 shows the partial guest state that is loaded during execution of the VMRUN instruction and saved during guest exit to the VMM 18 for the present embodiment. In the illustrated embodiment, the same processor state shown in table 100 is saved/loaded. Additionally, the hidden portion of the CS, DS, ES, and SS segment registers is saved/loaded as well as the debug registers DR6 and DR7 and the VM registers 46. Thus, in this embodiment, the partial state saved/loaded for a host and the partial state saved/loaded for a guest during a switch overlap but are not identical. In other embodiments, the same partial state may be saved/loaded for host and guest, or other overlapping subsets of processor state may be saved/loaded.

Figure 8:
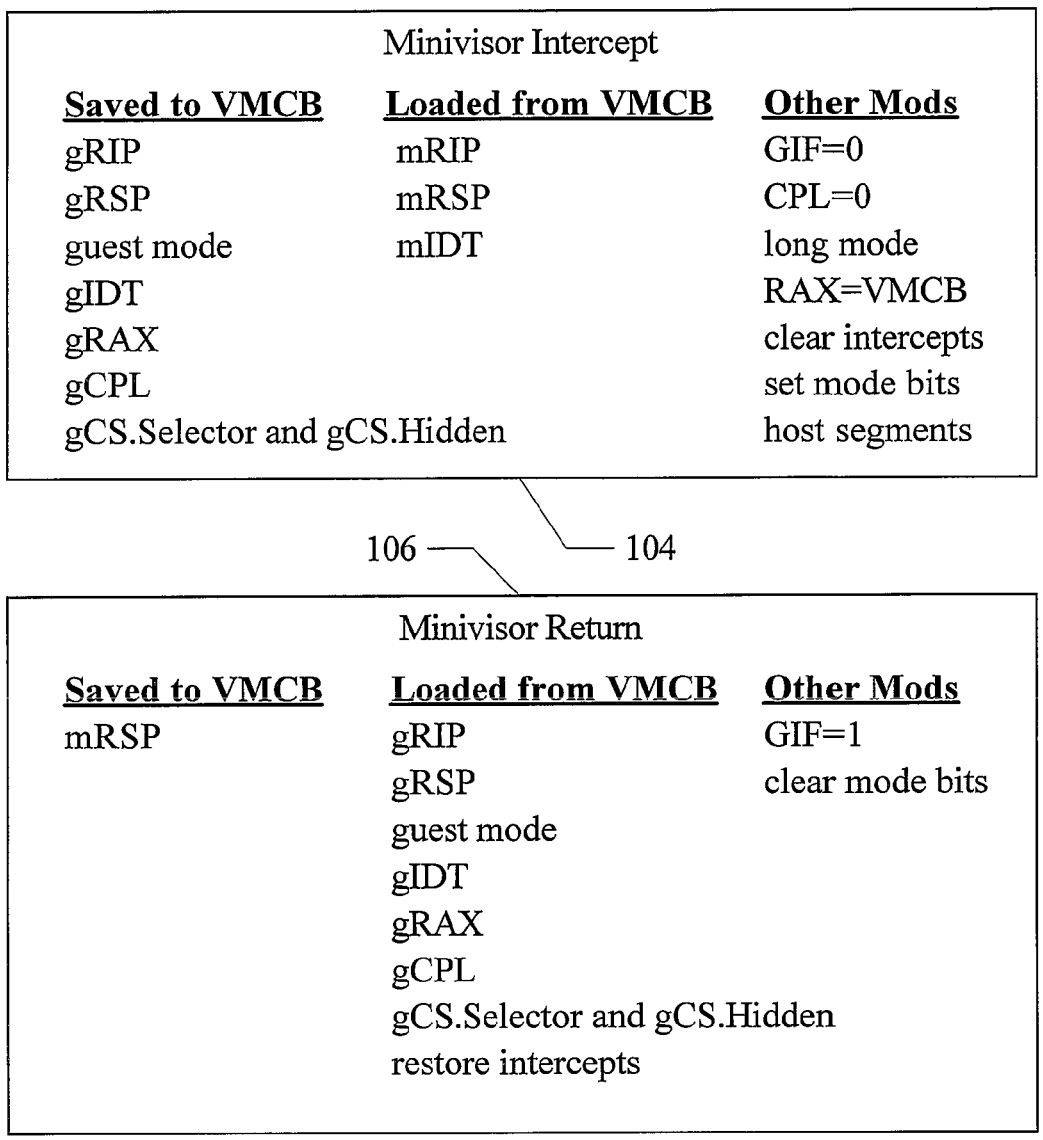
FIG. 8 is a pair of tables illustrating one embodiment of processor state saved and loaded during switches between minivisor and guest execution.

FIG. 8 is a pair of tables 104 and 106 illustrating the minivisor partial processor state saved and loaded for a minivisor intercept and a minivisor return, respectively, according to one embodiment of the processor 30 that implements the x86 instruction set architecture (including the AMD64™ extensions). The register names used in the tables 104 and 106 correspond to the names used in the x86 instruction set architecture with AMD64™ extensions, except that the names are preceded, in some cases, by a lower case "g" or a lower case "m". The lower case "g" refers to guest processor state, and the lower case "m" refers to minivisor processor state. Other embodiments may save/load any partial processor state, including any subset or superset of the state shown.

Table 104 illustrates state changes for a minivisor intercept (arrow 180 in FIG. 2). State saved to the VMCB 22 includes the following guest state: the RIP, the RSP, the guest mode, the IDT configuration, RAX, the current privilege level (CPL), and the CS segment selector and hidden portion. The guest state is stored into the guest processor state 60 of the VMCB 22. State loaded from the VMCB 22 (from the minivisor state 68) includes the RIP (which points to the initial instruction of the minivisor 172, and is the same each time the minivisor 172 is entered), the RSP, and the IDT configuration. Additionally, the processor 30 may force certain state to predefined values. The global interrupt flag (GIF) may be cleared; the CPL may be set to 0 (most privileged), the processor mode may be placed in long mode (the 64 bit extension mode of AMD64); the RAX may be set to the address of the VMCB, from the register 34; the intercept configuration may be cleared (so that no intercepts are enabled); a mode bit or bits indicating minivisor mode may be set (in some embodiments implementing such bits); and the host segment context may be loaded.

Table 106 illustrates state changes for a minivisor return to the guest (arrow 182 in FIG. 2). The RSP of the minivisor 172 may be saved back to the minivisor state 68 of the VMCB 22. The RIP is not stored because the minivisor 172 may be entered at the same point each time (the instruction indicated by the RIP), not from the exit point. The IDT configuration may not be subject to change by the minivisor 172, and thus also need not be saved. The same state that was stored to the VMCB 22 (in the guest processor state 60) is loaded from the VMCB 22. Additionally, the intercept configuration (e.g. intercepts 64 and 66) may be restored from the VMCB. The GIF may be set; and the minivisor mode bits (if implemented) may be cleared.

Accordingly, comparing tables 104-106 to tables 100-102, less state is stored and loaded for a minivisor exit mechanism than for a VMExit exit mechanism. Accordingly, the minivisor exit mechanism may be lighter weight, and may be lower latency than the VMExit exit mechanism, in some embodiments.

Figure 9:
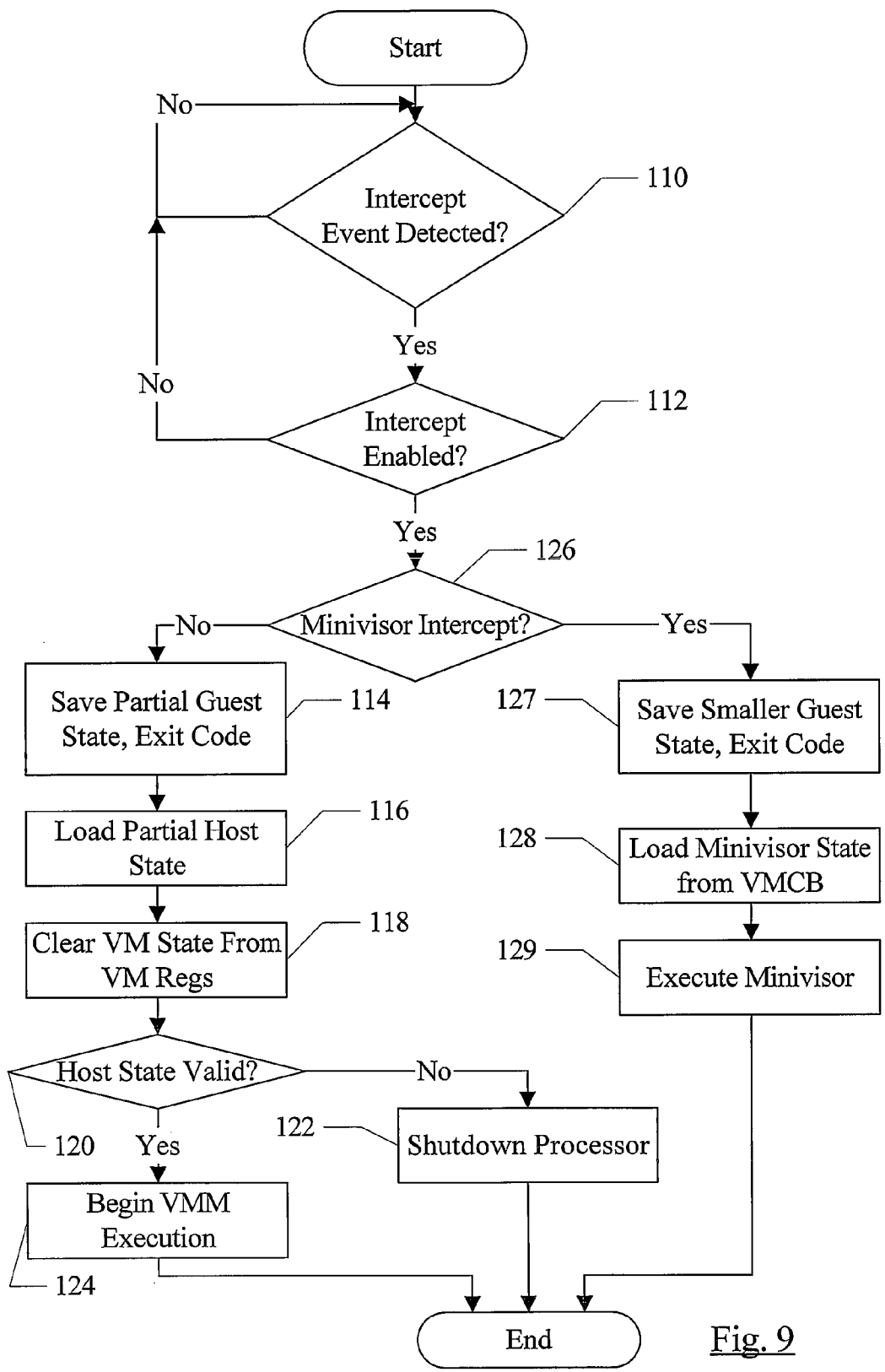
FIG. 9 is a flowchart illustrating one embodiment of intercepting an event in the guest.

Turning next to FIG. 9, a flowchart is shown illustrating operation of one embodiment of the processor 30 (and more particularly the execution core 32) for is detecting a guest exit and performing the guest exit. The processor 30/execution core 32 may comprise circuitry, microcode, or any combination thereof that implements the operation shown in FIG. 9. The execution may be pipelined over multiple clock cycles, if desired.

If the execution core 32 detects an intercept event (decision block 110, "yes" leg) and the corresponding intercept is enabled (in the VMCB 22, and loaded into the processor 30 when execution of the guest is started—decision block 112, "yes" leg) the execution core 32 exits the guest. If no intercept event is detected (decision block 110, "no" leg) or the intercept is not enabled (decision block 112, "no" leg), execution continues. The exit mechanism may also be determined from the intercept configuration (decision block 126)

If the guest is being exited using the VMExit mechanism (decision block 126, "no" leg), the execution core 32 may save the VMExit partial processor state into the guest's VMCB 22 and the exit code indicating the reason for exit (e.g. identifying the intercept event that was detected). As mentioned previously, the guest's VMCB 22 may be located by the address in the VMCB address register 34 (block 114). The execution core 32 may load the VMExit partial host state from the host save area 50, as located by the host save register 36 (block 116). Additionally, the execution core 32 may clear the VM state from the VM registers 46 (block 118). For example, the virtual interrupt request used to inject a virtual interrupt into a guest may be cleared to prevent the virtual interrupt from being taken in the VMM 18.

The execution core 32 may check the processor state as loaded from the host save area 50 to ensure that a valid state has been loaded (decision block 120). If an invalid state has been loaded (decision block 120, "no" leg), the execution core 32 may shutdown the processor 30 (block 122). In other embodiments, the execution core 32 may cause an exception or a guest exit, or may check the state in the host save area 50 and the processor 30 (for state not loaded during the guest exit) prior to loading the state to ensure that the state is valid. If the processor state is valid (decision block 120, "yes" leg), the execution core 32 may begin VMM execution (block 124).

If the exit is a minivisor intercept, using the minivisor exit mechanism (decision block 126, "yes" leg), the processor 30 may save the smaller minivisor partial guest state to the VMCB 22 and may load the minivisor partial state from the VMCB 22 (blocks 127 and 128). The processor 30 may then execute the minivisor 172 (block 129). In the illustrated embodiment, a check for valid minivisor state may be avoided since the state loaded is small. Other embodiments may check for a valid state as well.

Figure 10:
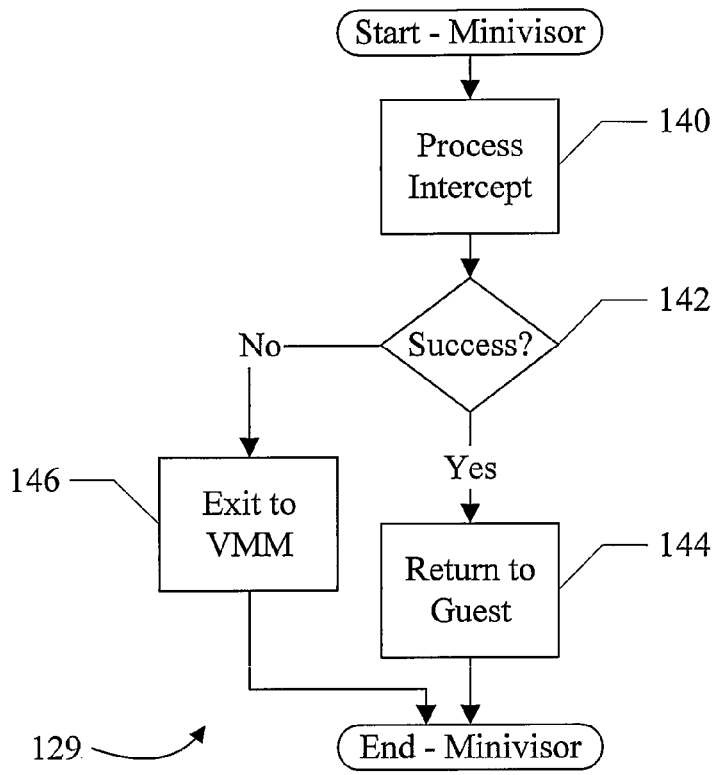
FIG. 10 is a flowchart illustrating operation of one embodiment of a minivisor.

FIG. 10 is a high level flowchart illustrating one embodiment of the execution of the minivisor 172. The details of a given minivisor 172 are implementation-specific. For example, one embodiment may virtualize the time stamp counter (TSC) and the minivisor may emulate accesses to the TSC. Various advanced programmable interrupt controller (APIC) virtualizations may be implemented, and the minivisor 172 may emulate the APIC. Any set of intercept processing may be implemented. The minivisor 172 may comprise instructions which, when executed, implement the operation of FIG. 10.

The minivisor 172 may process the detected intercept event (block 140). Generally, processing an intercept event may comprise taking any actions that are needed to ensure that the guest may continue executing correctly when the minivisor 172 returns. The processing may include emulating the intercepted event. For example, if the intercepted event is an instruction, the minivisor 172 may emulate the instruction (possibly updating processor state, like target registers, with the result or updating memory with a result). If the intercept event is an exception, processing the intercept event may include handling the exception.

If the minivisor 172 successfully processes the intercept event (decision block 142, "yes" leg), the minivisor 172 may return to the guest 170 (block 144). If the minivisor 172 is unsuccessful in processing the intercept event (decision block 142, "no" leg), the minivisor 172 may cause an exit to the VMM 18 (block 146). The exit may occur in various fashions. The minivisor 172 may be configured to exit directly to the VMM 18 (e.g. using the VMMCALL instruction), or may be configured to return to the guest 170 with an intercept flagged that will cause an exit to the VMM 18 from the guest. For example, the minivisor 172 may modify the intercept configuration so that the intercept event that caused the exit to the minivisor 172 is configured to use the VMExit mechanism to exit to the VMM 18.

Figure 11:
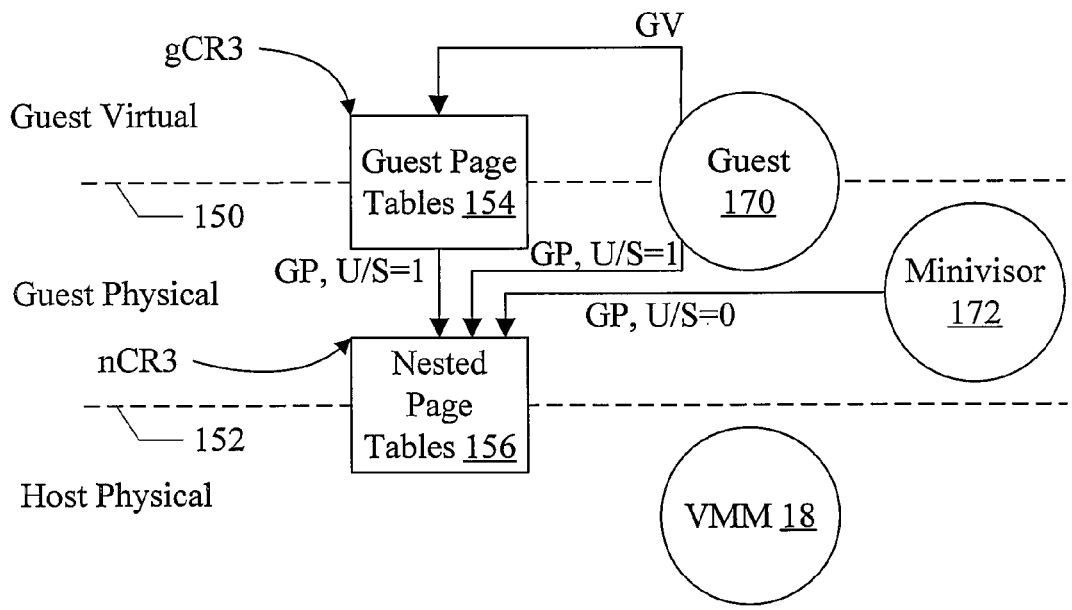
FIG. 11 is a block diagram illustrating one embodiment of address spaces in a virtualized computer system and the guest, minivisor, and host.

FIG. 11 is a block diagram illustrating various address spaces of one embodiment of the computer system, and operation of the various components shown in FIG. 2 within the address spaces for one embodiment. FIG. 11 illustrates a guest virtual address space (above dashed line 150), a guest physical address space (between dashed lines 150 and 152), and a host physical address space (below dashed line 152).

The guest 170 may run partially in the guest virtual address space and partially in the guest physical address space, illustrated by showing the guest 170 straddling the dashed line 150. For example, a guest 170 includes an OS and one or more applications may have the OS (or at least part of the OS) running in the guest physical address space and the applications running in the guest virtual address space. The guest 170 may manage a set of guest page tables 154, pointed to by a page table base address register (gCR3, in FIG. 11). The guest 170 may translate guest virtual addresses (GV in FIG. 11) to guest physical addresses (GP) through the guest page tables 154.

A set of nested page tables 156 is also shown in FIG. 11, that translates guest physical addresses to host physical addresses. The nested page tables 156 may be pointed to by a second page table base address register (nCR3, in FIG. 11). The two page table base address registers may be implemented in the translation circuitry 48 shown in FIG. 3, for example. The nested page tables 156 may be managed by the VMM 18.

The nested page tables 156 may translate guest physical addresses resulting from the guest page tables 156, as well as guest physical addresses generated directly by the guest 170 (e.g. by the OS). Additionally, the minivisor 172 may execute in the guest physical address space, and may thus generate guest physical addresses. The minivisor 172 may have access to the guest physical address space used by the guest, as well as the guest virtual address space (e.g. by reading the guest page tables 154). In one embodiment, the minivisor 172 may be allocated private guest physical pages in addition to having access to the guest's guest physical pages. That is, the private guest physical pages are accessible to the minivisor 172 but not the guest 170. The private guest physical pages may be supported in various fashions. For example, the private guest physical pages may be provided with supervisor level protection in the nested page tables 156 (U/S=1 in the AMD64 page tables). The guest physical pages used by the guest may be provided with user level protection in the nested page tables 156 (U/S=0 in the AMD64 page tables). Since the guest 170 generally executes in non-privileged (or user) mode (e.g. CPL of 3), the guest 170 may be unable to access the supervisor pages. By marking the minivisor's pages as supervisor (U/S=1), the minivisor's pages may be protected from the guest.

Figure 12:
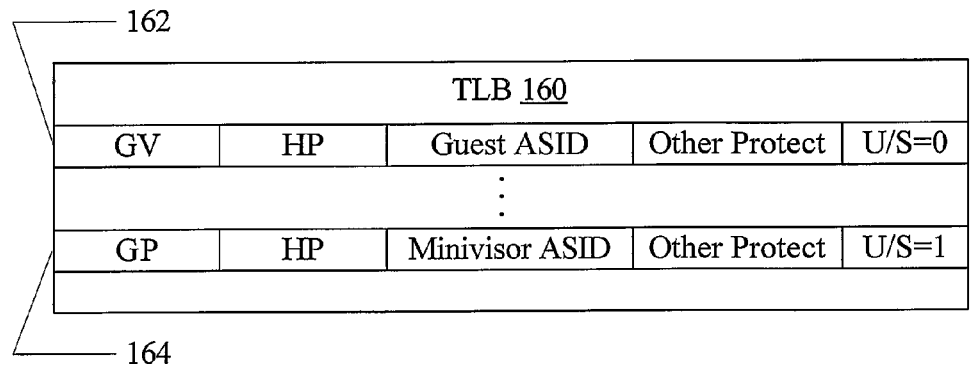
FIG. 12 is a block diagram of one embodiment of a translation lookaside buffer that may be implemented in the processor.

Turning now to FIG. 12, a block diagram of one embodiment of a TLB 160 is shown that may be implemented by the translation circuitry 48. The TLB 160 may include various entries, including an entry 162 and an entry 164. The entry 162 in FIG. 12 is illustrated storing a guest translation, which translates from the guest virtual address (GV) to a host physical address (HP). In this embodiment, then TLB 160 may tag entries with an address space identifier (ASID) corresponding to the process that generated the translation request corresponding to the entry. Thus, the entry 152 stores a guest ASID assigned to the guest 170. Various other protection data (Other Protect, in FIG. 12) may be stored, and the U/S bit for the translation may be 0. The entry 164 stores a minivisor translation, and thus translates from a guest physical (GP) to a host physical (HP) address. The ASID may be a minivisor ASID, and the other protection and U/S fields (U/S=1, in this case) are provided. The minivisor ASID may be provided in any fashion. The minivisor ASID may be the same as the guest ASID for the corresponding guest, and an additional bit may be set in the entry to indicate that the entry is a minivisor entry. Alternatively, the minivisor ASID may be equal to the guest ASID+1 (or −1, in other embodiments). The minivisor ASID may also be separately assigned. A hit is detected in an entry if the input address (GV in entry 162, GP in entry 164) matches the address to be translated, the entry is valid, and the ASID in the entry matches the current ASID.

Figure 13:
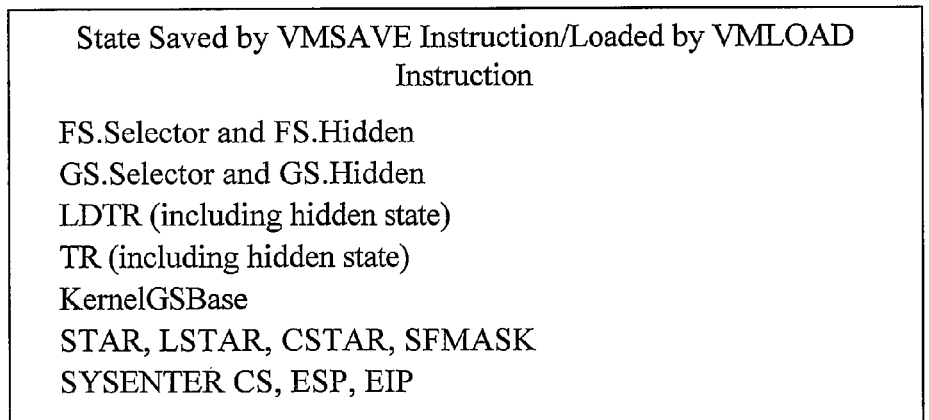
FIG. 13 is a table illustrating one embodiment of processor state saved and loaded in response to VMSAVE and VMLOAD instructions.

FIG. 13 is a table 130 illustrating additional processor state saved via execution of the VMSAVE instruction and loaded via execution of the VMLOAD instruction for one embodiment. Other embodiments may save/load any state, including any subset or superset of the state shown. In the illustrated embodiment, state saved/loaded includes the selector and hidden portions of the FS and GS segment registers; the local descriptor table register (LDTR) including hidden portion that stores the descriptor for the local descriptor table from the global descriptor table; the task register (TR) including hidden state; the KernelGSBase register defined in the AMD64™ extension; the STAR, LSTAR, CSTAR, and SFMASK registers used with the SYSCALL and SYSRET instructions; and the CS, ESP, and EIP values used with the SYSENTER instruction.

Figure 14:
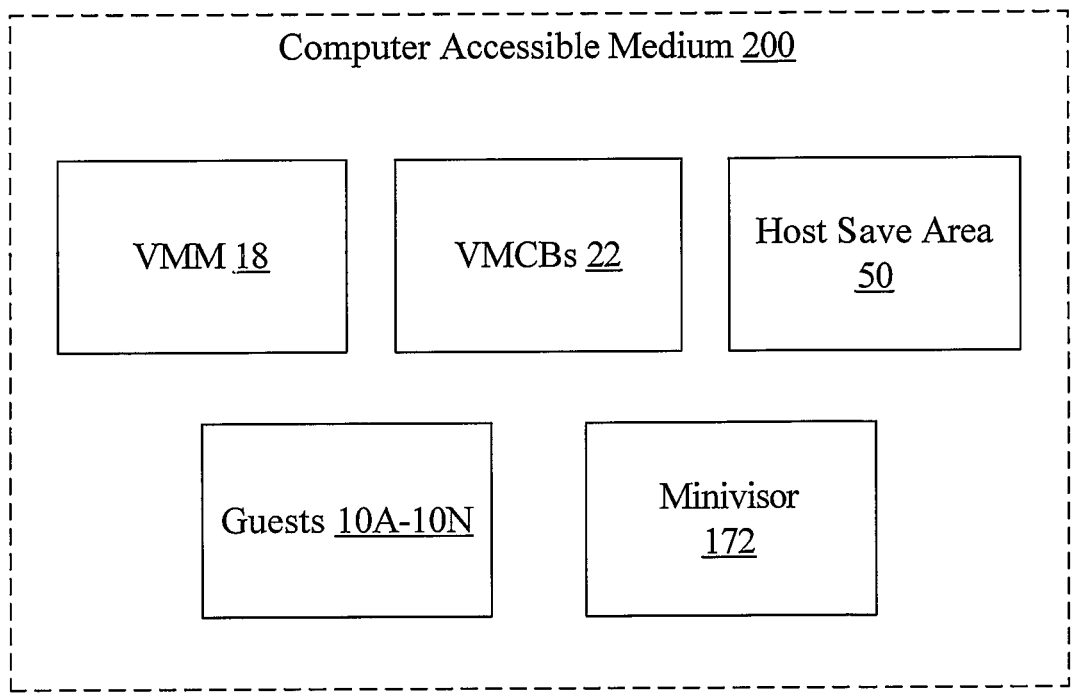
FIG. 14 is a block diagram of one embodiment of a computer accessible medium.

Turning now to FIG. 14, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. The computer accessible medium 200 may also include storage media accessible via transmission media such as a network and/or a wireless link. The computer accessible medium 200 in FIG. 14 may store one or more of the VMM 18, one or more VMCBs 22, the host save area 50, the minivisor 172, and/or guests 10A-10N. The VMM 18 may comprise instructions which implement the operations described for the VMM 18 herein. Generally, the computer accessible medium 200 may store any set of instructions which, when executed, implement a portion or all of the operations shown in FIG. 10. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A processor comprising:
one or more registers configured to store an intercept configuration that identifies which of a plurality of intercept events are enabled for intercept during guest execution, and wherein the intercept configuration identifies, for each enabled intercept event, which of at least two exit mechanisms are to be used in response to detection of the enabled intercept event; and
an execution core coupled to the one or more registers, wherein the execution core is configured to detect one of the enabled intercept events during execution of a guest and to exit the guest using the exit mechanism identified in the intercept configuration for that detected, enabled intercept event, wherein a first exit mechanism of the at least two exit mechanisms invokes first code that executes in a guest address space associated with the guest, and wherein a second exit mechanism of the at least two exit mechanisms invokes a virtual machine monitor (VMM) that controls the guest, and wherein the intercept configuration comprises a respective first intercept indication for each of the plurality of intercept events that indicates whether or not the intercept event is enabled, and a respective second intercept indication for each of the plurality of intercept events that indicates the exit mechanism to be used if the intercept event is enabled and detected.

2. The processor as recited in claim 1 wherein the execution core comprises translation circuitry configured to translate addresses generated by the execution core, and wherein the translation circuitry is configured to translate the addresses responsive to a translation mechanism, and wherein the translation mechanism comprises guest page tables corresponding to the guest and a second set of page tables that translate the result of the guest page tables, and wherein the translation circuitry is configured to translate addresses only through the second set of page tables in response to the first exit mechanism.

3. The processor as recited in claim 2 wherein at least some translations in the second set of page tables are not useable by the guest but are useable by code executing in response to the first exit mechanism.

4. The processor as recited in claim 1 wherein the respective first intercept indication is a bit.

5. The processor as recited in claim 4 wherein the respective second intercept indication is a bit.

6. A processor comprising:
one or more registers configured to store an intercept configuration that identifies which of a plurality of intercept events are enabled for intercept during guest execution, and wherein the intercept configuration identifies, for each enabled intercept event, which of at least two exit mechanisms are to be used in response to detection of the enabled intercept event; and
an execution core coupled to the one or more registers, wherein the execution core is configured to detect one of the enabled intercept events during execution of a guest and to exit the guest using the exit mechanism identified in the intercept configuration for that detected, enabled intercept event, wherein a first exit mechanism of the at least two exit mechanisms invokes first code that executes in a guest address space associated with the guest, and wherein a second exit mechanism of the at least two exit mechanisms invokes a virtual machine monitor (VMM) that controls the guest, and wherein the execution core is configured to save a first amount of processor state corresponding to the guest as part of the first exit mechanism, and wherein the execution core is configured to save a second amount of processor state corresponding to the guest as part of the second exit mechanism, wherein the second amount is greater than the first amount, wherein the processor state is saved to a first data structure in memory that is assigned to the guest, and wherein the execution core is configured to load at least a portion of processor state used by the first code from the first data structure into the processor as part of the first exit mechanism.

7. The processor as recited in claim 6 wherein both the first amount and the second amount are less than a total amount of processor state.

8. The processor as recited in claim 6 wherein the execution core is configured to load at least a portion of processor state for the VMM from a second data structure that is separate from the first data structure as part of the second exit mechanism.

9. The processor as recited in claim 6 wherein the execution core is configured to force a second portion of the processor state to a predetermined value.

10. The processor as recited in claim 6 wherein the execution core comprises translation circuitry configured to translate addresses generated by the execution core, and wherein the translation circuitry is configured to translate the addresses responsive to a translation mechanism, and wherein the translation mechanism comprises guest page tables corresponding to the guest and a second set of page tables that translate the result of the guest page tables, and wherein the translation circuitry is configured to translate addresses only through the second set of page tables in response to the first exit mechanism.

11. The processor as recited in claim 10 wherein at least some translations in the second set of page tables are not useable by the guest but are useable by code executing in response to the first exit mechanism.

12. A processor comprising:
one or more registers configured to store an intercept configuration that identifies which of a plurality of intercept events are enabled for intercept during guest execution, and wherein the intercept configuration identifies, for each enabled intercept event, which of at least two exit mechanisms are to be used in response to detection of the enabled intercept event; and
an execution core coupled to the one or more registers, wherein the execution core is configured to detect one of the enabled intercept events during execution of a guest and to exit the guest using the exit mechanism identified in the intercept configuration for that detected, enabled intercept event, wherein a first exit mechanism of the at least two exit mechanisms invokes first code that executes in a guest address space associated with the guest, and wherein a second exit mechanism of the at least two exit mechanisms invokes a virtual machine monitor (VMM) that controls the guest, and wherein the first exit mechanism invokes the first code without invoking the VMM, wherein the intercept configuration comprises a first intercept indication for each of the plurality of intercept events that indicates whether or not the intercept event is enabled to use a first exit mechanism of the at least two exit mechanisms, and a second intercept indication for each of the plurality of intercept events that indicates whether or not the intercept event is enabled to use a second exit mechanism of the at least two exit mechanisms.

13. The processor as recited in claim 12 wherein the execution core comprises translation circuitry configured to translate addresses generated by the execution core, and wherein the translation circuitry is configured to translate the addresses responsive to a translation mechanism, and wherein the translation mechanism comprises guest page tables corresponding to the guest and a second set of page tables that translate the result of the guest page tables, and wherein the translation circuitry is configured to translate addresses only through the second set of page tables in response to the first exit mechanism.

14. The processor as recited in claim 13 wherein at least some translations in the second set of page tables are not useable by the guest but are useable by code executing in response to the first exit mechanism.

15. A method comprising:
detecting an enabled intercept event during execution of a guest on a processor that supports guest virtualization, wherein an intercept configuration identifies which of a plurality of intercept events are enabled for intercept, and wherein the intercept configuration identifies, for each enabled intercept event, which of at least two exit mechanisms are to be used in response to detection of the enabled intercept event; and
the processor exiting the guest using the exit mechanism identified in the intercept configuration for the detected, enabled intercept event, wherein exiting the guest using a first exit mechanism of the at least two exit mechanisms comprises invoking first code that executes in a guest address space associated with the guest, and wherein exiting the guest using a second exit mechanism of the at least two exit mechanisms comprises invoking a virtual machine monitor (VMM) that controls the guest; and
during the exiting, the processor saving a first amount of processor state corresponding to the guest to a first data structure that is assigned to the guest, wherein the saving is part of the first exit mechanism; and
during the exiting, the processor loading at least a portion of processor state used by the first code from the first data structure as part of the first exit mechanism.

16. The method as recited in claim 15 wherein the exiting comprises:
saving a first amount of processor state corresponding to the guest as part of the first exit mechanism; and
saving a second amount of processor state corresponding to the guest as part of the second exit mechanism, wherein the second amount is greater than the first amount.

17. The method as recited in claim 15 further comprising executing the first code on the processor, wherein the executing comprises:
determining that the intercept event is not processable by the first code; and
exiting to the VMM using the second exit mechanism responsive to the determining.

18. The method as recited in claim 17 wherein exiting to the VMM using the second exit mechanism comprises:
the first code returning to the guest with a second intercept event indicated; and
the guest exiting using the second exit mechanism responsive to the second intercept event.

19. The method as recited in claim 17 wherein exiting to the VMM using the second exit mechanism comprises executing one or more instructions which cause the exiting.

* * * * *

UNITED STATES PATENT AND TRADEMARK OFFICE
CERTIFICATE OF CORRECTION

PATENT NO. : 8,561,060 B2
APPLICATION NO. : 11/740463
DATED : October 15, 2013
INVENTOR(S) : Serebrin et al.

It is certified that error appears in the above-identified patent and that said Letters Patent is hereby corrected as shown below:

In the Claims:

Claim 1, cols. 17 and 18, please delete lines "62-67" and "1-12", and insert

--an execution core coupled to the one or more registers, wherein the execution core is configured to detect one of the enabled intercept events during execution of a guest and to exit the guest using the exit mechanism identified in the intercept configuration for that detected, enabled intercept event, wherein a first exit mechanism of the at least two exit mechanisms invokes a first plurality of instructions that executes in a guest address space associated with the guest and that attempts to process the detected, enabled intercept event and returns to the guest in response to successfully processing the detected, enabled intercept event, and wherein a second exit mechanism of the at least two exit mechanisms invokes a virtual machine monitor (VMM) that controls the guest, and wherein the first exit mechanism invokes the first plurality of instructions without invoking the VMM, and wherein the intercept configuration comprises a respective first intercept indication for each of the plurality of intercept events that indicates whether or not the intercept event is enabled, and a respective second intercept indication for each of the plurality of intercept events that indicates the exit mechanism to be used if the intercept event is enabled and detected.-- in place thereof.

Claim 3, col. 18, line 26, please delete "code" and insert --the first plurality of instructions-- in place thereof.

Signed and Sealed this
Eighteenth Day of February, 2014

Michelle K. Lee
*Deputy Director of the United States Patent and Trademark Office*

CERTIFICATE OF CORRECTION (continued)
U.S. Pat. No. 8,561,060 B2

Claim 6, col. 18, please delete lines "40-62", and insert

--an execution core coupled to the one or more registers, wherein the execution core is configured to detect one of the enabled intercept events during execution of a guest and to exit the guest using the exit mechanism identified in the intercept configuration for that detected, enabled intercept event, wherein a first exit mechanism of the at least two exit mechanisms invokes a first plurality of instructions that executes in a guest address space associated with the guest and that attempts to process the detected, enabled intercept event and returns to the guest in response to successfully processing the detected, enabled intercept event, and wherein a second exit mechanism of the at least two exit mechanisms invokes a virtual machine monitor (VMM) that controls the guest, and wherein the execution core is configured to save a first amount of processor state corresponding to the guest as part of the first exit mechanism, and wherein the execution core is configured to save a second amount of processor state corresponding to the guest as part of the second exit mechanism, wherein the second amount is greater than the first amount, wherein the processor state is saved to a first data structure in memory that is assigned to the guest, and wherein the execution core is configured to load at least a portion of processor state used by the first plurality of instructions from the first data structure into the processor as part of the first exit mechanism.-- in place thereof.

Claim 11, col. 19, line 20, please delete "code" and insert --the first plurality of instructions-- in place thereof.

Claim 12, col. 19, please delete lines "30-50", and insert

--an execution core coupled to the one or more registers, wherein the execution core is configured to detect one of the enabled intercept events during execution of a guest and to exit the guest using the exit mechanism identified in the intercept configuration for that detected, enabled intercept event, wherein a first exit mechanism of the at least two exit mechanisms invokes a first plurality of instructions that executes in a guest address space associated with the guest and that attempts to process the detected, enabled intercept event and returns to the guest in response to successfully processing the detected, enabled intercept event, and wherein a second exit mechanism of the at least two exit mechanisms invokes a virtual machine monitor (VMM) that controls the guest, and wherein the first exit mechanism invokes the first

CERTIFICATE OF CORRECTION (continued)
U.S. Pat. No. 8,561,060 B2 plurality of instructions without invoking the VMM, and wherein the intercept configuration comprises a first intercept indication for each of the plurality of intercept events that indicates whether or not the intercept event is enabled to use a first exit mechanism of the at least two exit mechanisms, and a second intercept indication for each of the plurality of intercept events that indicates whether or not the intercept event is enabled to use a second exit mechanism of the at least two exit mechanisms.-- in place thereof.

Claim 15, col. 20, please delete lines "17-26", and insert

--the processor exiting the guest using the exit mechanism identified in the intercept configuration for the detected, enabled intercept event, wherein exiting the guest using a first exit mechanism of the at least two exit mechanisms comprises invoking a first plurality of instructions that executes in a guest address space associated with the guest and that attempts to process the detected, enabled intercept event and returns to the guest in response to successfully processing the detected, enabled intercept event, and wherein exiting the guest using a second exit mechanism of the at least two exit mechanisms comprises invoking a virtual machine monitor (VMM) that controls the guest, and wherein the first exit mechanism invoking the first plurality of instructions is performed without invoking the VMM;-- in place thereof.

Claim 12, col. 20, line 32, please delete "code" and insert --plurality of instructions-- in place thereof.

Claim 17, col. 20, line 43, please delete "code" and insert --plurality of instructions-- in place thereof.

Claim 17, col. 20, line 46, please delete "code" and insert --plurality of instructions-- in place thereof.

Claim 18, col. 20, line 51, please delete "code" and insert --plurality of instructions-- in place thereof.